Nov. 23, 1943.     W. E. JOHNSON     2,335,150
SCALING HAMMER
Filed July 3, 1941
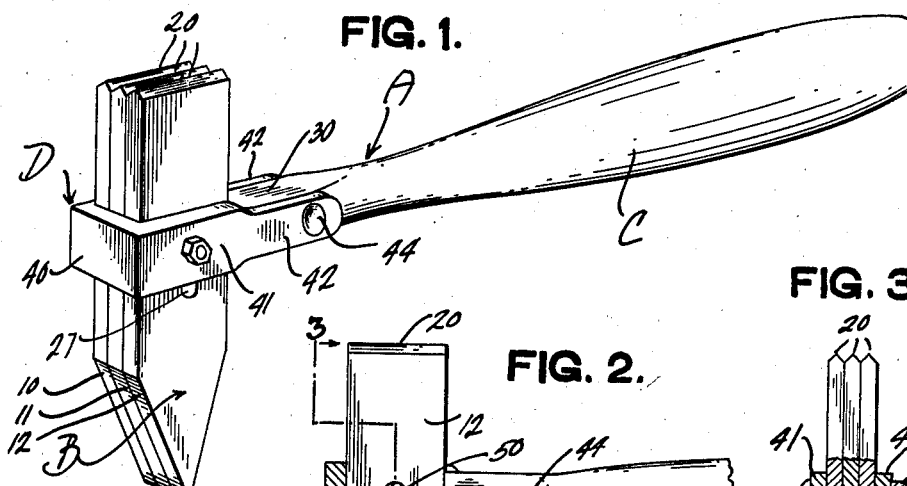
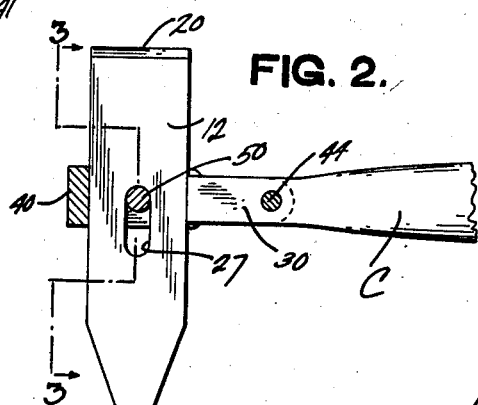
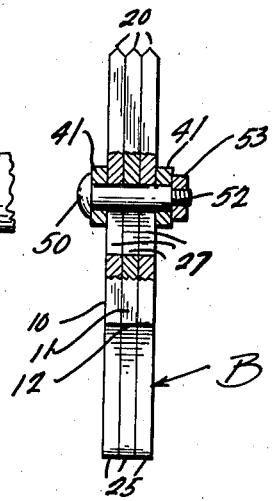
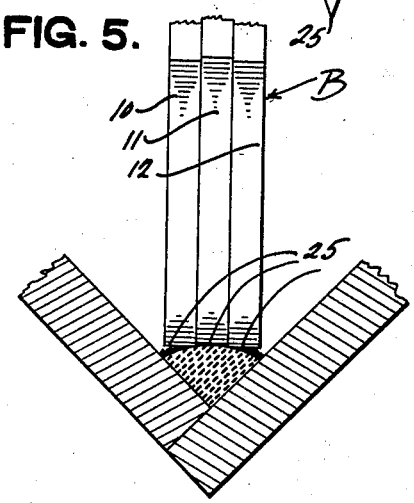
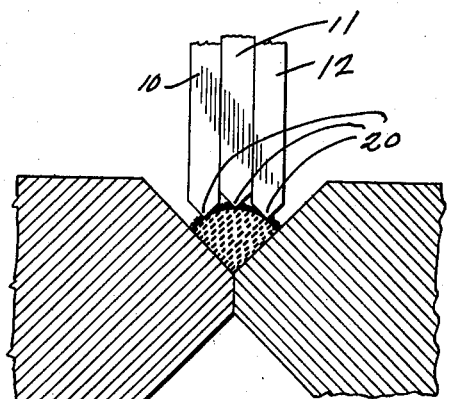
INVENTOR.
William E. Johnson
BY
ATTORNEYS.

Patented Nov. 23, 1943

2,335,150

UNITED STATES PATENT OFFICE 2,335,150

SCALING HAMMER

William E. Johnson, Beebe, Ark.

Application July 3, 1941, Serial No. 401,052

3 Claims. (Cl. 29—81)

The invention relates to improvements in scaling tools.

The primary object of this invention is a tool simulating a hammer which has a multiple part head so that the effective article engaging portion thereof may adjust itself to suit an irregular contour.

A further object of this invention is a provision of an improved tool preferably adapted for use by those whose work it is to scale boilers, and embodying an improved scaling head formed of a plurality of parts so that the effective scaling surface thereof may adjust itself to an irregular contour, such as a welding bead.

Other objects and advantages of this invention will be apparent during the course of the following detailed description. In the accompanying drawing, forming a part of this specification and wherein similar reference characters designate corresponding parts throughout the several views.

Figure 1 is a perspective view of the improved tool.

Figure 2 is a fragmentary view, partly in section, showing the manner in which the head of the tool rests in its handle and supporting construction.

Figure 3 is a sectional view taken substantially on the line 3—3 of Figure 2.

Figure 4 is a view showing the manner in which chisel edges of the improved tool head may be employed in chipping scale from a welding bead.

Figure 5 is a fragmentary section of the opposite end of the tool head showing how it may be employed in close quarters for chipping scale from a weld.

In the drawing, wherein for the purpose of illustration is shown only a preferred embodiment of the invention, the letter A may generally designate the improved tool, which may include the improved scale chipping tool head B, mounted upon a preferably wooden handle by means of a stirrup or strap D.

Referring to the improved tool head B, the same is preferably constructed of a plurality of flat tool steel sections 10, 11 and 12. The number may vary, but preferably the arrangement is that shown in the drawing. Each of these flat sided tool steel head portions, in case the tool is intended for use as a boiler scaling tool, may conform to the following dimensions: length 6 inches, width 1¼ inches, thickness $\frac{3}{16}$ of an inch. The invention is of course, not restricted to the dimensions given. Each tool section 10, 11 and 12, at one end thereof, where the edge is normal to the axis of the length of the section, is provided with a beveled chisel edge 20; the sides to perfect said edge being beveled at an angle of 45°. The opposite end of each section is tapered gradually to an edge 25 normal to the thickness of the section. This edge 25 lies in the center line marking the length axis of the tool head section.

The complementary tool head sections 10, 11 and 12 are all of the same size and adapted to the position so that the chisel edges 20 are parallel, and the opposite point edges 25 align when the tool head is at rest, as shown in the drawing.

The tool head sections 10, 11 and 12 are provided with transversely disposed slots 27, which are elongated along the center line of the length axis of the tool head, as shown in the drawing.

The handle C is preferably of wood, and flattened at its end 30.

The strap or stirrup D is preferably of metal, including a bight portion 40; side portions 41 and the handle attaching ends 42 contiguous with the portions 41; adapted to lie at the opposite flat sides of the tool handle flattened portion 30. A rivet or rivets 44 are employed to secure the strap ends 42 upon the handle; the fore end of the strap or stirrup D then projecting beyond the end of the handle and providing a socket in which the head B is disposed for reciprocation, and preferably against tilting.

The manner of assemblage of the tool head B in the strap or stirrup is well shown in the drawing. Preferably the corresponding side edges of the sections 10, 11 and 12 abut in sliding engagement against an end of the tool handle C and the opposite side edges of said head sections slide in abutment against the inside surface of the strap bight 40.

A bolt 50 is provided upon the strap portions 41; transversely extending through the socket provided by said strap and extending loosely through the elongated slots 27. The bolt 50 has a head which engages one of the strap portions 41 and its other end is provided with a reduced screw threaded shank 52 to receive a nut 53. The shoulder at the juncture of the bolt with the screw threaded shank 52 receives the nut 53 thereagainst to prevent binding of the tool head sections 10, 11 and 12 in the strap should the nut be clamped too firmly.

The manner of using the tool will be apparent from the foregoing. It is extremely difficult to remove scale from irregular contours, such as presented in boilers at welding beads and in sharp corners. Normally, for straight line surfaces where the quarters are not too close, I prefer to use the chisel edges 20 of the head section, as shown in Figure 4. However, in closer corners and quarters it is preferable to use the point edges 25, as shown in Figure 5. The sections of the tool head are loose enough to permit their relative displacement, at the time of blow of the hammer, so that the chipping edges thereof may conform to the contour of the surface being chipped.

It is apparent from the foregoing that a scale chipping tool has been provided which will enable more efficient and faster work to be accomplished. I am also aware that the improved tool has other uses than that of chipping scale from boilers.

Various changes in the shape, size and arrangement of parts may be made in the form of invention herein shown and described, without departing from the spirit of the invention and the scope of the claims.

I claim:

1. In a tool for chipping scale and the like the combination of a supporting handle, a tool head comprising a plurality of flat work engaging parts, and means mounting the said parts for relative transverse sliding along the axis of the tool head, each of said parts having one work engaging sharpened edge parallel with the plane of the part and another sharpened edge transverse to the plane of the part.

2. A scaling hammer comprising a handle, a plurality of flat work engaging parts each of which is pointed at an end thereof to define a sharp chisel edge which lies normal to the plane of the part, and means relatively slidably mounting said parts upon the handle so that the chisel edges of the parts may lie in the same line or in stepped relation to each other, each of said parts at the opposite end having a chisel edge which lies in the same plane as the plane of the part.

3. A scale chipping tool comprising an elongated handle, a stirrup secured to an end of said handle, having a bight portion, side portions extending therefrom toward said handle, and handle-attaching ends, with said bight portion spaced from the nearest end of said handle, whereby said handle and said bight and side portions provide a socket; a tool head, comprising a plurality of elongated tool sections, each section being independently slidable in said socket, each provided at each of its opposite end edges, normal to the longitudinal axis of the section, with a chipping edge, the chipping edge of one end edge being normal to the chipping edge of the opposite end edge, and the ends of said section, normal to said first-named ends thereof, slidable over the inner faces of said bight portion and said end of said handle, each tool section having a transversely disposed slot, with the longitudinal axis thereof normal to the longitudinal axis of said handle; a bolt carried by said side portions and extending loosely thru all of said slots; and means rigidly securing said handle-attaching ends to said handle.

WILLIAM E. JOHNSON.